United States Patent [19]

Ortner et al.

[11] Patent Number: 5,334,285
[45] Date of Patent: Aug. 2, 1994

[54] PROCESS FOR THE TREATMENT OF WASTEPAPER USING DRUM SOAKER

[75] Inventors: Herbert Ortner; Theodor Bahr; Walter Musselmann, all of Heidenheim, Fed. Rep. of Germany

[73] Assignee: J. M. Voith GmbH, Fed. Rep. of Germany

[21] Appl. No.: 66,409

[22] Filed: May 21, 1993

Related U.S. Application Data

[63] Continuation of Ser. No. 797,216, Nov. 25, 1991, abandoned.

[30] Foreign Application Priority Data

Nov. 23, 1990 [DE] Fed. Rep. of Germany ....... 4037230

[51] Int. Cl.$^5$ .......................... D21C 5/02; D21B 1/32
[52] U.S. Cl. ........................................ 162/4; 162/55; 209/3; 241/24
[58] Field of Search ............... 162/4, 5, 55; 209/3, 209/17; 241/21, 24, 28

[56] References Cited

U.S. PATENT DOCUMENTS

| | | | |
|---|---|---|---|
| 4,465,591 | 8/1984 | Holz et al. | 162/4 |
| 4,622,099 | 11/1986 | Eelman | 162/4 |
| 4,818,338 | 4/1989 | Bahr et al. | 162/4 |
| 4,861,117 | 3/1989 | Pfalzer et al. | 162/4 |

FOREIGN PATENT DOCUMENTS

| | | | |
|---|---|---|---|
| 2751084 | 12/1978 | Fed. Rep. of Germany | 162/4 |
| 3144561 | 5/1983 | Fed. Rep. of Germany | 162/4 |
| 2096661 | 10/1980 | United Kingdom | 162/4 |
| 2121703 | 1/1984 | United Kingdom | 162/4 |

*Primary Examiner*—Karen M. Hastings
*Attorney, Agent, or Firm*—Baker & Daniels

[57] ABSTRACT

The invention concerns a process for the treatment of wastepaper, carried out for the most at a high consistency of at least 13% in the first stages, beginning the dissolution (soaking) and including a coarse sorting stage. The invention is characterized in that in the case of wastepaper containing a share of at least 40% of deinking wastepaper provided with printing inks the three first process stages, namely in this order of soaking, coarse cleaning and the further extensive dissolution of the wastepaper, take place at a considerable reduction of the wastepaper shreds to the usual speck size at a consistency of at least 13%, and the soaking under considerable addition of dissolving chemicals, and that the wastepaper including essentially all heavy contaminations, such as part of wood, glass, plastic or metal contained in the wastepaper, including pieces of metal straps of the wastepaper bales, is fed to the process.

6 Claims, 2 Drawing Sheets

PROCESS FOR THE TREATMENT OF WASTEPAPER USING DRUM SOAKER

This is a continuation of application Ser. No. 07/797,216, filed Nov. 25, 1991, now abandoned.

BACKGROUND OF THE INVENTION

The invention concerns a process for the treatment of imprinted wastepaper, as well as arrangements for the performance of the process. Such a process is known from DE-OS 30 40 998. In this process, the soaking is carried out in a drum which is rotatable about a horizontal axis. The soaking process is proposed to be carried out at consistencies of 20 to 40%. Thereafter, the wastepaper is heavily diluted with water, so that another sorting process can be carried out in a drum rotatable about a horizontal axis and equipped with a shell that is provided with screen perforations, the sorting taking place at a consistency between 8 and 12%. The hole sizes there are 4 to 12 mm in diameter.

It has been demonstrated that the removal of printing inks from the fibers can be performed more efficiently if the wastepaper to be processed is prior to the actual dissolution is treated by means of pulper or drum using a solution of chemicals, i.e., that it is quasi "presoaked/-preimpregnated."

In this "preimpregnation," the printing ink binders are softened to a point such that the printing ink particles can in the following dissolution process be separated from the fibers more effectively than is the case without "preimpregnation." The preimpregnation is most suitably carried out at a consistency of more than 12%.

The patent document DE 35 22 395 C1 also provides for "presoaking" the wastepaper, stacking it in a reaction tower and dissolving it in the tower base by means of a pulper, where coarse contaminations of the wastepaper, for example plastic foils, pieces of wire and similar, can be continuously removed from the fiber suspension.

This process has the disadvantage that only a slight share of contaminations may be contained in the wastepaper because, e.g., a share higher than 1% (based on otto wastepaper) may lead to bridge formation, clogging etc. in the tower base, the elimination of which is time-consuming and associated with considerable production losses.

The problem underlying the present invention is to perform, in the treatment of wastepaper containing a very high share of paper imprinted with printing inks, the removal of the printing inks very efficiently and effectively. There is to be no further presorting of the wastepaper necessary, so that then all contaminations may proceed into the treatment process. Moreover, the investments in time and chemicals should be relatively favorable.

SUMMARY OF THE INVENTION

The process described here avoids the disadvantages in the prior art, since the wastepaper containing contaminants and, as the case may be, pieces of wire, is treated here in a presoaking drum at substance consistencies >12% and temperatures >18° C. in the presence of chemicals for more than 20 minutes, and the contained coarse contaminations are thereafter separated, as the case may be, without intermediate dilution, by means of a coarse sorting drum or coarse sorter (for example planar sorter or similar) at a consistency of at least 13% (based on otto wastepaper fibers). The openings (perforations, slots, etc.) should be so chosen here that no still undissolved wastepaper pieces will be discarded with the rejects.

The still undiluted accepts are further treated and dissolved so as to be pumpable, in a facultatively third drum or a pulper, with further ink-separating and/or bleaching chemicals being added, as the case may be. Next, a further sorting operation may follow.

This dissolution of the third initial stage of the process is carried to a very small speck size, so that at least 95% of the wastepaper can pass a screen perforation, for example in a disk sorter, of 10 mm diameter.

The described novel process has the advantage that the presoak/dissolution process can be performed continuously while the dissolution/printing ink separation and, as the case may be, bleaching process can be performed so efficiently that thereby a considerably faster and more efficient printing ink separation can be achieved in the subsequent process steps, along with a considerably faster and more efficient bleaching effect. The reaction time of the chemicals, specifically when using rotating drums for the first two stages, becomes relatively long and favorable at a very high consistency, all the more so as a high consistency is given also in the third stage.

It is customary to perform the removal of the printing inks finally in a flotation system which is predominantly of a multiple stage design. Owing to their known design, the subsequent steps of fine sorting and flotation are not explained in detail.

Suitable as chemicals for the treatment process in the first three stages are 0.5 to 4% NaOH as well as 0.4% to 1.5% $H_2O_2$ and 0.5 to 3% water glass as well as 0.1 to 0.5% DTPA (diethylenetriaminepentaacetic acid), based on the otro furnish of wastepaper.

The chemicals added in the bleaching stage can be supplemented with further chemicals in the third stage, the dissolution stage.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DESCRIPTION OF THE PREFERRED EMBODIMENT

Figure 1:
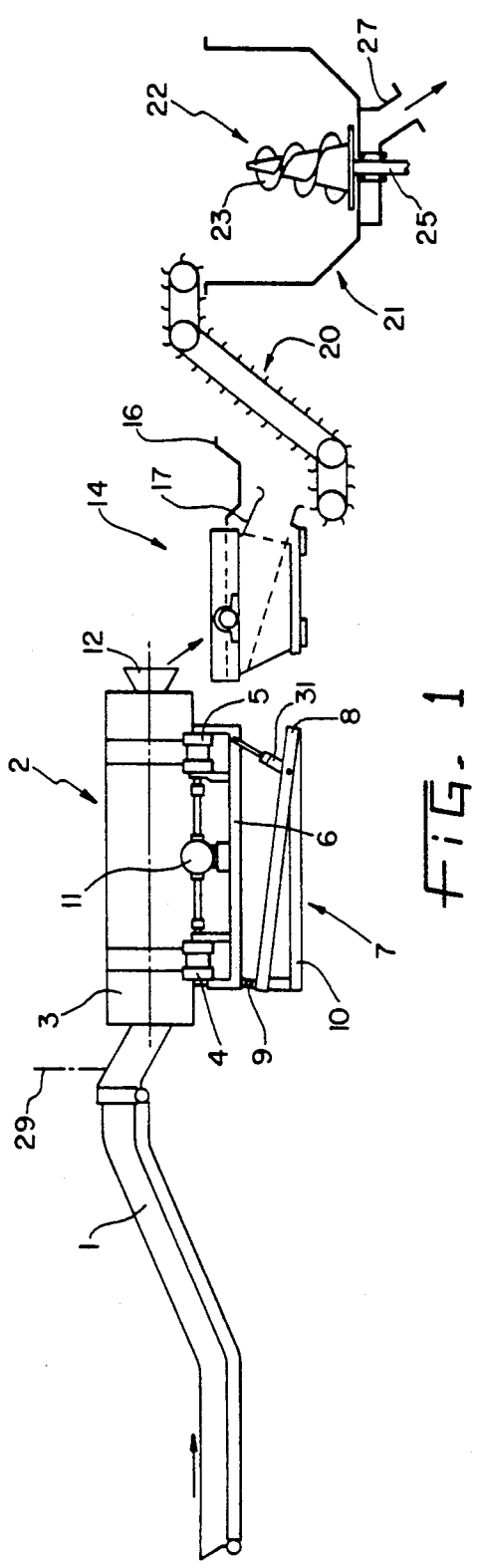
FIG. 1 shows a view of a first embodiment of the invention.

The wastepaper is fed in bale form via the conveyer 1 of the drum 2 rotating about the horizontal axis, indicated by dashed line, and introduced in the feeding end 3 of the drum. Up to at least about 80% of the treated wastepaper may contain printing ink. This drum is rotatably mounted on rolls 4 and driven by a motor 11 through the illustrated jointed shafts. The drum is designed here so as to be tiltable—which, however, is not absolutely required—through a frame 10 featuring on the left side a joint 9 and a power cylinder 31 with a connecting rod on the right-hand side. For that purpose, the drive mechanism and support parts of the drum rest on a frame 6. Thus, the contents of the drum proceeds more or less quickly—depending on the drum inclination—to the discharge shaft 12, where the soaked amount of paper stock is introduced in a vibrating sorter 14. The wastepaper and contaminants are soaked in the presence of process chemicals so that a portion of the paper is disintegrated into fibers. The process chemicals are present in an amount comprising at least 40% of a total amount that would be required for substantially complete disintegration of the wastepaper and separation into printing inks. The soaking time in the drum amounts to at least 15 minutes, and more generally to around 30 minutes or more. In the vibrating sorter, the coarse contaminations are sorted out and passed on to a collection device 16, which in its lower part also may be designed as a conveyer. The screen fiber is by way of the chute 17 passed on as accepts to a conveyer 20 which feeds the wastepaper substance with the high consistency, which has been retained, to the pulper 21. The consistency in the soaking process in the drum amounts to at least 13%; essentially, even 25 to 35% may prevail here, based on the otro substance furnished, naturally. The chemicals are admixed to the substance in a suitable manner in the soaking drum 2, specifically fed with the soaking water through the line 29. Further chemicals may be added also at the pulper 21.

The hole diameter of the screen plate of the vibrating sorter ranges between 30 and 60 mm.

This pulper features preferably a rotor 22 provided with a vertical shaft while supporting on its circumference essentially helical circulation ribs 23 which upwardly decrease spirally in their outside diameter and, as the case may be, also become narrower. The shaft of the rotor is marked 25. Screened accepts are drained from the pulper through the withdrawal socket 27, after previously having preferably passed a screen plate.

It is also possible to use for all three of the described process steps a uniform consistency between 14 and 28%.

Figure 2:
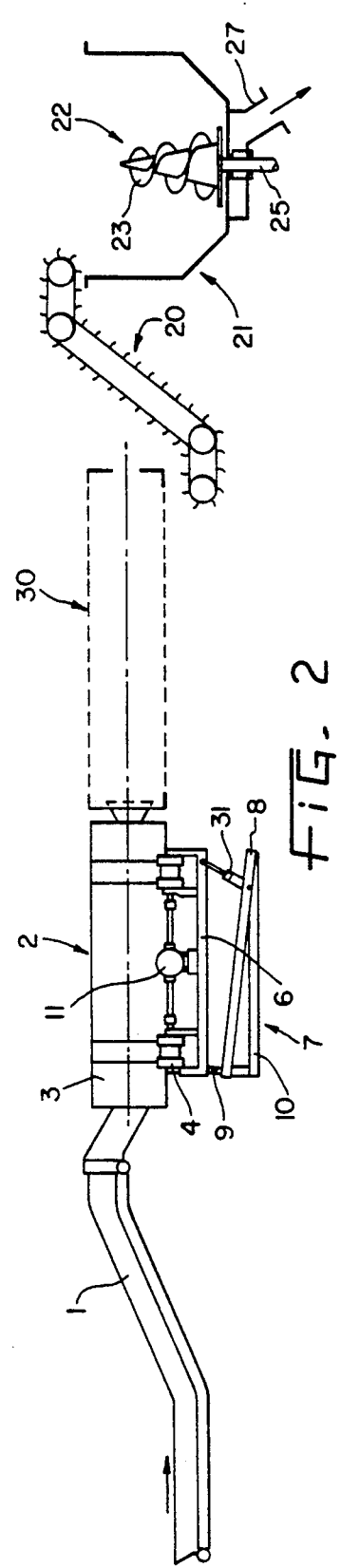
FIG. 2 shows a second embodiment using a perforated screen drum.

The following modifications are possible on the illustrated arrangement:

1. Instead of the vibrating sorter 14, a rotatable drum 30 (refer to FIG. 2) with a perforated shell may as well be provided, which is rotatable about a horizontal axis as well. In this case, similar to the drum 3, the feeding end is the one end and the delivery end of the contaminations is the other end, while the accepts are separated through the perforations of the drum shell.

The screen perforation ranges there preferably between 30 and 60 mm. In this way it is safeguarded that the fiber will not be discarded along with the contaminations.

2. Instead of the pulper 21, a drum rotatable about a horizontal axis could as well be provided, which on the discharge end features the same design as the drum 2 and, in this area, also a perforation. If the perforation is not present or available, the delivery would be on the one end, the same as on the drum 2. On the other hand, if a perforation is provided, accepts could be withdrawn through the perforation and the first, namely fraction containing the major share of the tailings through the discharge opening on the end side.

The three illustrated stages would then be followed by further sorting stages, and specifically a flotation system, in order to finally remove the separated printing inks from the fiber suspension. This would take place according to the customary process using the known flotation chemicals, specifically soap or fatty acid.

It is preferable that the soaking takes place under circulation movements, the sorting and, as the case may be, the dissolution of the third stage, in a rotating drum with a horizontal axis of rotation while performing circulation and/or abrupt movements, facultatively in conjunction with tossing the wastepaper up and/or dropping it.

Moreover—in order to require the expense of little drive capacity—the speed of rotation of the soaking drum 2 is favorably held low—maximally 15 RPM and preferably 4 to 10, possibly lower than that of the screen drum 30—while avoiding heavily pronounced entrainment ribs so as to obtain a gentle circulation of the drum content—unlike in the sorting drum 30.

Figure 3:
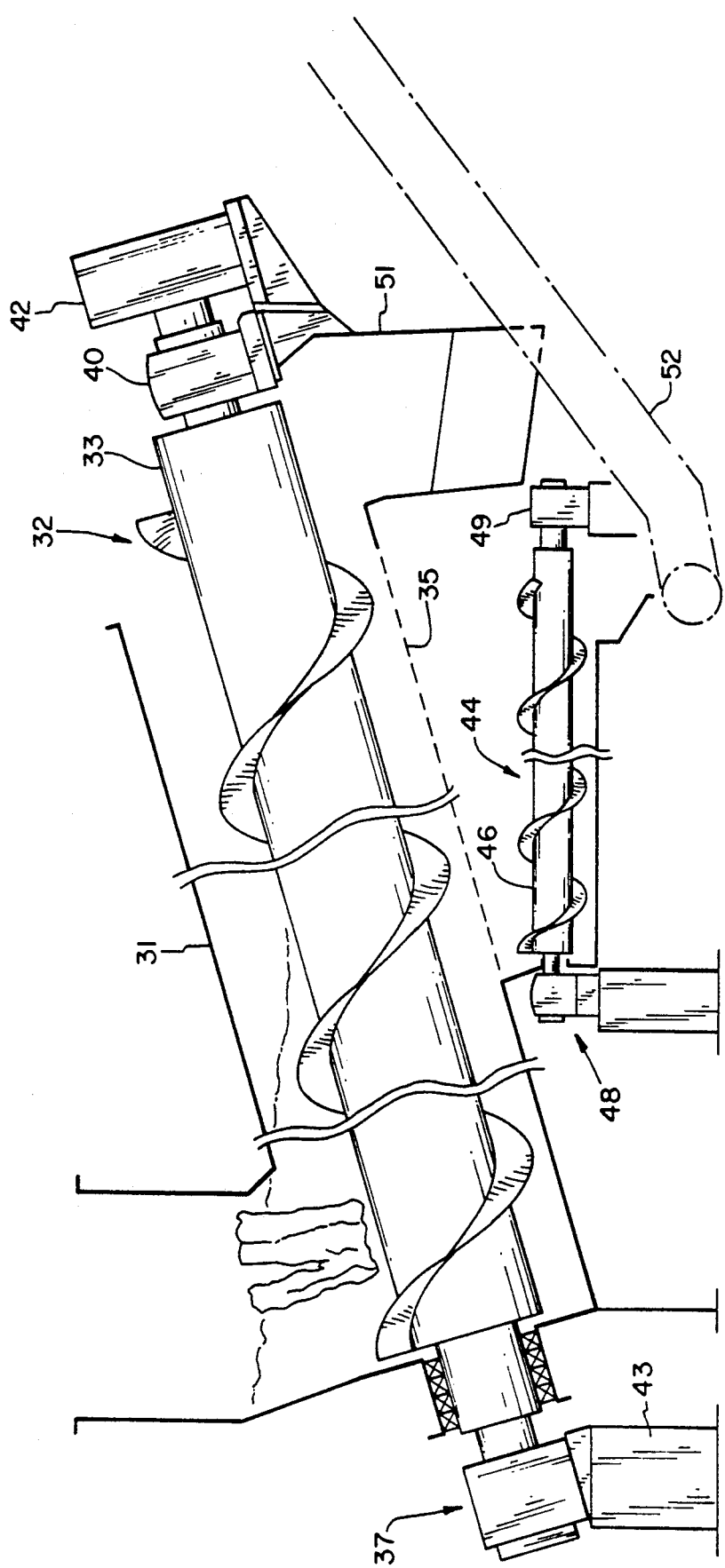
FIG. 3 shows a further variant of the invention.

FIG. 3 illustrates a variant where the soaking and sorting takes place along a feed screw 32 in a container 31. Its shaft 33 is mounted in bearings 37 and 40 and driven by the motor 42. The lower bearing 37 rests on a foundation 43. The first part of the container 31 surrounding the worm is not perforated, whereas the second part is provided with a screen perforation between 30 and 60 mm at its bottom—as indicated at 35. The separated accepts fiber material is removed here by the feed screw 44 toward a conveyer 52. The coarse contaminations to be separated leave through the shaft 51 at the end of the feed screw. The shaft 46 of the small feed screw 44 is mounted with its ends in bearings 48 and 49. The drive is not shown here. The illustrated arrangement may then be followed—as shown in the other FIGS.—by a pulper or a dissolution drum with a horizontal axis of rotation. The feed screw 32 is preferably driven in reverse. The feeding of the wastepaper bales may take place in essentially unsplit condition.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for the treatment of wastepaper and accompanying heavy contaminants, said contaminants being selected from the group consisting of wood, glass, plastic and metal contained in the wastepaper, and metal straps from wastepaper bales, wherein a major proportion of said wastepaper is imprinted with printing inks, said process comprising the sequential steps of:

soaking said wastepaper and contaminants in a first rotating drum soaker in the presence of process chemicals so that a portion of said paper is disintegrated into fibers, said process chemicals being present in an amount comprising at least 40% of a total amount that would be required for substantially complete disintegration of said wastepaper and separation of said printing inks;

directly conveying said soaked wastepaper and contaminants to a sorting apparatus;

sorting coarse contaminants from said soaked wastepaper solution in said sorting apparatus by screening;

conveying said sorted soaked wastepaper to a pulper;

extensively dissolving said wastepaper into fibers in said pulper, said soaking, sorting and dissolution steps taking place at a consistency of at least 13%; and separating said printing ink from said fibers.

2. The process of claim 1, wherein said sorting apparatus comprises a second rotating drum, each of said first and second rotating drums having a horizontal axis of rotation.

3. The process of claim 1, wherein the sorting of the coarse contaminants by screening takes place via a screen having respective hole diameters between 30 and 60 mm.

4. The process of claim 1, wherein said soaking, sorting and dissolution steps are carried out at the same consistency of between 14 and 28%.

5. The process of claim 1, wherein up to at least 80% of said wastepaper contains printing inks.

6. A process for the treatment of wastepaper and accompanying heavy contaminants, said contaminants being selected from the group consisting of wood, glass, plastic and metal contained in the wastepaper, and metal straps from wastepaper bales, wherein a major proportion of said wastepaper is imprinted with printing inks, said process comprising the sequential steps of:

soaking said wastepaper and contaminants in a first rotating drum under circulation movements in the presence of process chemicals so that a portion of said wastepaper is disintegrated into fibers, said process chemicals being present in an amount comprising at least 40% of a total amount that would be required for substantially complete disintegration of said wastepaper and separation of said printing inks;

directly conveying said soaked wastepaper and contaminants to a sorting apparatus;

sorting coarse contaminants from said soaked wastepaper solution in said sorting apparatus by screening, said sorting apparatus comprising a second rotating drum;

directly conveying said sorted soaked wastepaper to a disintegrating apparatus, said disintegrating apparatus having a rotor for stirring said wastepaper;

extensively dissolving said wastepaper in said disintegrating apparatus, said soaking, sorting and dissolution steps taking place at a consistency of at least 13%; and separating said printing ink from said fibers.

* * * * *